(12) United States Patent
Kimura et al.

(10) Patent No.: US 12,250,020 B2
(45) Date of Patent: Mar. 11, 2025

(54) TIMING DETECTION DEVICE AND METHOD THEREOF

(71) Applicant: FURUNO ELECTRIC CO., LTD., Hyogo (JP)

(72) Inventors: Daisuke Kimura, Ashiya (JP); Yusuke Toyoda, Amagasaki (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 26 days.

(21) Appl. No.: 18/343,564

(22) Filed: Jun. 28, 2023

(65) Prior Publication Data

US 2023/0344464 A1 Oct. 26, 2023

Related U.S. Application Data

(63) Continuation-in-part of application No. PCT/JP2022/000459, filed on Jan. 11, 2022.

(30) Foreign Application Priority Data

Feb. 15, 2021 (JP) ................................. 2021-021995

(51) Int. Cl.
*H04B 1/707* (2011.01)
*H04B 1/7073* (2011.01)
*H04L 7/04* (2006.01)

(52) U.S. Cl.
CPC ............. *H04B 1/7073* (2013.01); *H04L 7/04* (2013.01)

(58) Field of Classification Search
CPC ................................. H04B 1/7073; H04L 7/04
See application file for complete search history.

(56) References Cited

U.S. PATENT DOCUMENTS 6,567,482 B1 5/2003 Popovic'
8,335,283 B1 * 12/2012 Sun ..................... H04L 27/2613
375/316

(Continued)

FOREIGN PATENT DOCUMENTS

EP 3683970 A1 7/2020
JP H03-503352 A 7/1991

(Continued)

OTHER PUBLICATIONS

International Search Report issued in PCT/JP2022/000459; mailed Mar. 22, 2022.

(Continued)

*Primary Examiner* — Freshteh N Aghdam
(74) *Attorney, Agent, or Firm* — Studebaker Brackett PLLC

(57) ABSTRACT

A timing detection device includes a main reference code generation module, an auxiliary reference code generation module, a first correlation processing module, a second correlation processing module, and a subtraction module. The main reference code generation module generates a main reference code consisting of the same code for synchronization included in a received signal. Using a portion of the same code as the code for synchronization, the auxiliary reference code generation module generates an auxiliary reference code consisting of a code configuration different from the main reference code and without generating a main lobe during correlation processing. The first correlation processing module correlates the received signal with the main reference code and outputs a first correlation result. The second correlation processing module correlates the received signal with the auxiliary reference code and outputs a second correlation result. The subtraction module (Continued)

subtracts the first correlation result from the second correlation result.

20 Claims, 10 Drawing Sheets

(56) References Cited

U.S. PATENT DOCUMENTS

| | | | | |
|---|---|---|---|---|
| 8,446,931 | B1* | 5/2013 | Keller, Jr. | H04B 1/7073 375/147 |
| 2004/0196926 | A1 | 10/2004 | Chien et al. | |
| 2009/0285269 | A1* | 11/2009 | Zhang | H04B 1/7073 375/150 |
| 2018/0219575 | A1* | 8/2018 | Hafuka | H04B 1/709 |

FOREIGN PATENT DOCUMENTS

| | | |
|---|---|---|
| JP | 2000-341261 A | 12/2000 |
| JP | 2002-198863 A | 7/2002 |
| JP | 2005-311532 A | 11/2005 |
| JP | 2005-321359 A | 11/2005 |
| WO | 90/06635 A1 | 6/1990 |

OTHER PUBLICATIONS

Extended European Search Report issued in EP 22 75 2492.3-1206 by the European Patent Office on Dec. 3, 2024, which is related to U.S. Appl. No. 18/343,564.

* cited by examiner

| RU | SW | LCID | DS | RD | GD |

RU : RAMP-UP  DS : DATA SYMBOL
SW : SYNCWORD  RD : RAMP-DOWN
LCID : LINK CONFIG ID  GD : GUARD TIME

FIG. 3

| 1,1,1,1,1,0,0,1,1,0,1,0,1 | 0,0,0,0,0,1,1,0,0,1,0,1,0 |

| 1,1,1,1,1,0,0,1,1,0,1,0,1 | 0,0,0,0,0,1,1,0,0,1,0,1,0 |

| 1,1,1,1,1,0,0,1,1,0,1,0,1 | 1,1,1,1,1,0,0,1,1,0,1,0,1 |

TIMING DETECTION DEVICE AND METHOD THEREOF

CROSS-REFERENCE TO RELATED APPLICATION(S)

This application is a continuation-in-part of PCT International Application No. PCT/JP2022/000459, which was filed on Jan. 11, 2022, and which claims priority to Japanese Patent Application No. 2021-021995 filed on Feb. 15, 2021, the entire disclosures of each of which are herein incorporated by reference for all purposes.

TECHNICAL FIELD

The present disclosure generally relates to time detection techniques and more particularly relates to devices and methods for detecting timing upon receiving a digitally modulated signal.

BACKGROUND

A Japanese patent document, JP 2005311532 A, titled "Radio communication method and device", describes a wireless communication method and device for receiving a signal modulated with a barker code. In standardized radio communication, optional additional data are transmitted with a flag signal for notifying Quantum Channel (Qch) of the existence of a signal by using the data region of Qch that is not used when a preamble signal is transmitted without violating the standard. At the reception side, normal demodulation processing is made when the flag signal cannot be detected, and the additional data are demodulated when the flag signal is detected.

However, in the above prior art, when the correlation is performed using a spread code such as a conventional barker code and a predetermined timing such as a slot timing is detected, a relatively large side lobe occurs in the correlation result. This may cause an error in the detected timing.

Therefore, a need exists to suppress the side lobe during correlation processing.

SUMMARY

In order to solve the foregoing problem and to provide other advantages, one aspect of the present disclosure is to provide a timing detection device. The timing detection device includes a main reference code generation module, an auxiliary reference code generation module, a first correlation processing module, a second correlation processing module, and a subtraction module. The main reference code generation module is configured to generate a main reference code consisting of the same code as a code for synchronization included in a received signal. The auxiliary reference code generation module, by using a portion of the same code as the code for synchronization, is configured to generate an auxiliary reference code consisting of a code configuration different from the main reference code and suppressing the generation of a main lobe during a correlation process. The first correlation processing module is configured to output a first correlation result by correlating the received signal with the main reference code. The second correlation processing module is configured to output a second correlation result by correlating the received signal with the auxiliary reference code. The subtraction module is configured to subtract the first correlation result from the second correlation result.

In an aspect, the code for synchronization is composed of a first code sequence of a non-inversion code consisting of a prescribed spread code and an inversion code of the spread code; and the auxiliary reference code generation module is further configured to generate the auxiliary reference code using the first code sequence of the non-inversion code.

In an aspect, the auxiliary reference code is a sequence code of the non-inversion code.

In an aspect, the code for synchronization is composed of a second code sequence of a non-inversion code consisting of a prescribed spread code and an inversion code of the spread code; and the auxiliary reference code generation module is further configured to generate the auxiliary reference code using a sequence code of the inversion code.

In an aspect, the auxiliary reference code is the sequence code of the inversion code.

In an aspect, the code for synchronization is a Barker code.

In an aspect, a timing detection method includes generating a main reference code consisting of the same code as a code for synchronization included in a received signal. The method further includes generating an auxiliary reference code consisting of a code configuration different from the main reference code by using a portion of the same code as the code for synchronization and suppressing generation of a main lobe during a correlation process. The method further includes outputting a first correlation result by correlating the received signal with the main reference code. The method further includes outputting a second correlation result by correlating the received signal with the auxiliary reference code. The method further includes subtracting the first correlation result from the second correlation result.

In an aspect, the code for synchronization is composed of a sequence code of a non-inversion code consisting of a prescribed spread code and an inversion code of the spread code and an inversion code of the spread code; and the auxiliary reference code is generated using the sequence code of the non-inversion codes.

In an aspect, the auxiliary reference code is the sequence code of the non-inversion code.

In an aspect, the code for synchronization is composed of a sequence code of a non-inversion code consisting of a prescribed spread code and an inversion code of the spread code; and the auxiliary reference code is generated using a sequence code of the inversion codes.

In an aspect, the auxiliary reference code is the sequence code of the inversion code.

In an aspect, the code for synchronization is a Barker code.

Effect(s)

According to the disclosure, the sidelobe during correlation processing can be suppressed.

BRIEF DESCRIPTION OF THE DRAWINGS

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those skilled in the art will understand that the drawings are not to scale.

FIG. 3 illustrates an example data configuration of a signal for the AIS, in accordance with an embodiment of the present disclosure;

FIG. 4 illustrates a bit array of Syncword (SW) data, in accordance with an embodiment of the present disclosure;

FIG. 5A illustrates an example of a bit arrangement of a main reference code, in accordance with a first embodiment of the present disclosure;

FIG. 5B is a diagram showing an example of a bit arrangement of an auxiliary reference code, in accordance with the first embodiment of the present disclosure;

Figure 1:
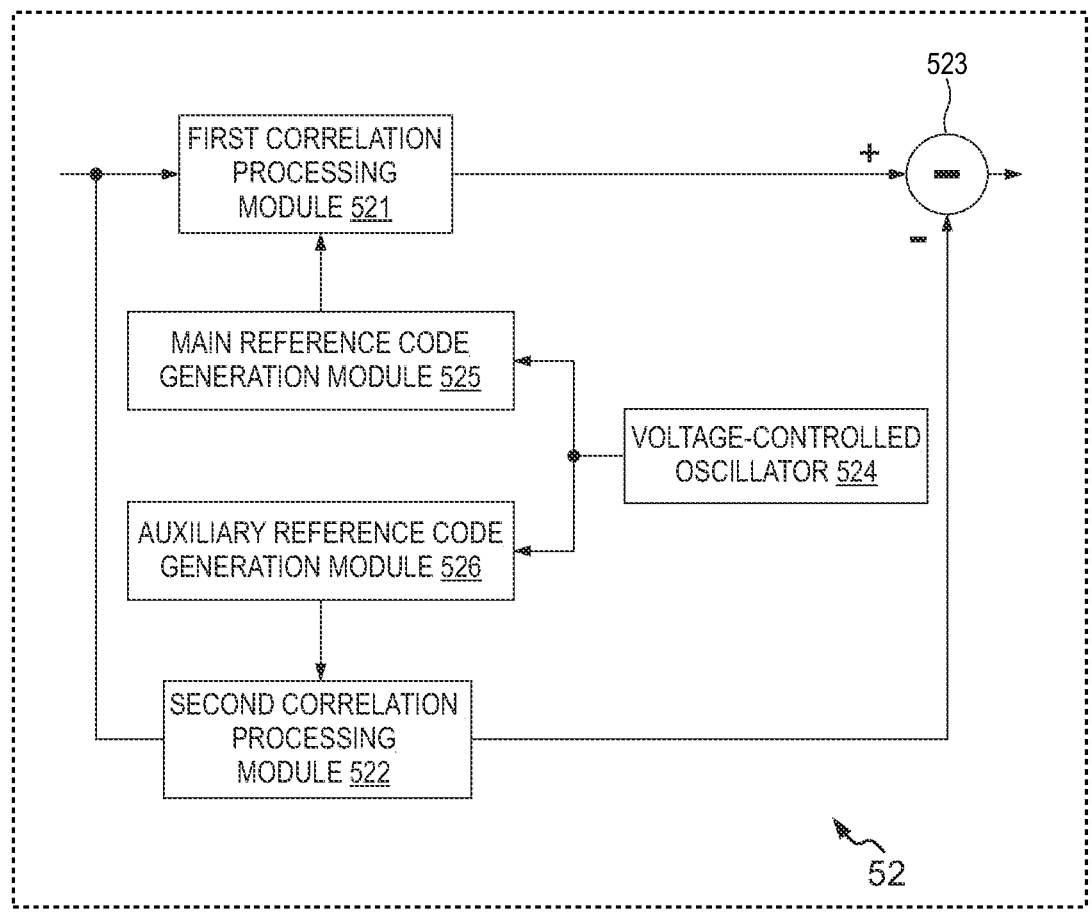
FIG. 1 illustrates a functional block diagram of a timing detection device, in accordance with an embodiment of the present disclosure.

The drawings referred to in this description are not to be understood as being drawn to scale except if specifically noted, and such drawings are only exemplary in nature.

DETAILED DESCRIPTION OF THE DISCLOSURE

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments described herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an Application Specific Integrated Circuit (ASIC), a Field Programmable Gate Array (FPGA) or other programmable device that performs logic operations without processing computer-executable instructions. A processor can also be implemented as a combination of computing devices, e.g., a combination of a Digital Signal Processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

Various embodiments of the present disclosure relate to devices and methods for detecting timing upon receiving a digitally modulated signal. Various embodiments of the present disclosure are described hereinafter with reference to FIG. 1 to FIG. 14.

A timing detection technique according to a first embodiment of the present disclosure will be described with reference to the figures. FIG. 1 is a functional block diagram of a timing detection device 52 (hereinafter also interchangeably referred to as a "correlation module 52") according to an embodiment of the present disclosure.

As shown in FIG. 1, the timing detection device 52 or the correlation module 52 includes a first correlation processing module 521, a second correlation processing module 522, a subtraction module 523, a Voltage-Controlled Oscillator (VCO) 524, a main reference code generation module 525, and an auxiliary reference code generation module 526. The first correlation processing module 521, the second correlation processing module 522, the subtraction module 523, the Voltage-Controlled Oscillator (VCO) 524, the main reference code generation module 525, and the auxiliary reference code generation module 526 can be realized by an arithmetic processing unit or processing circuitry 599 such as a personal computer or a dedicated electronic circuit.

The VCO 524 generates a reference frequency signal for correlation processing. The VCO 524 outputs the reference frequency signal to the main reference code generation module 525 and the auxiliary reference code generation module 526.

Figure 2:
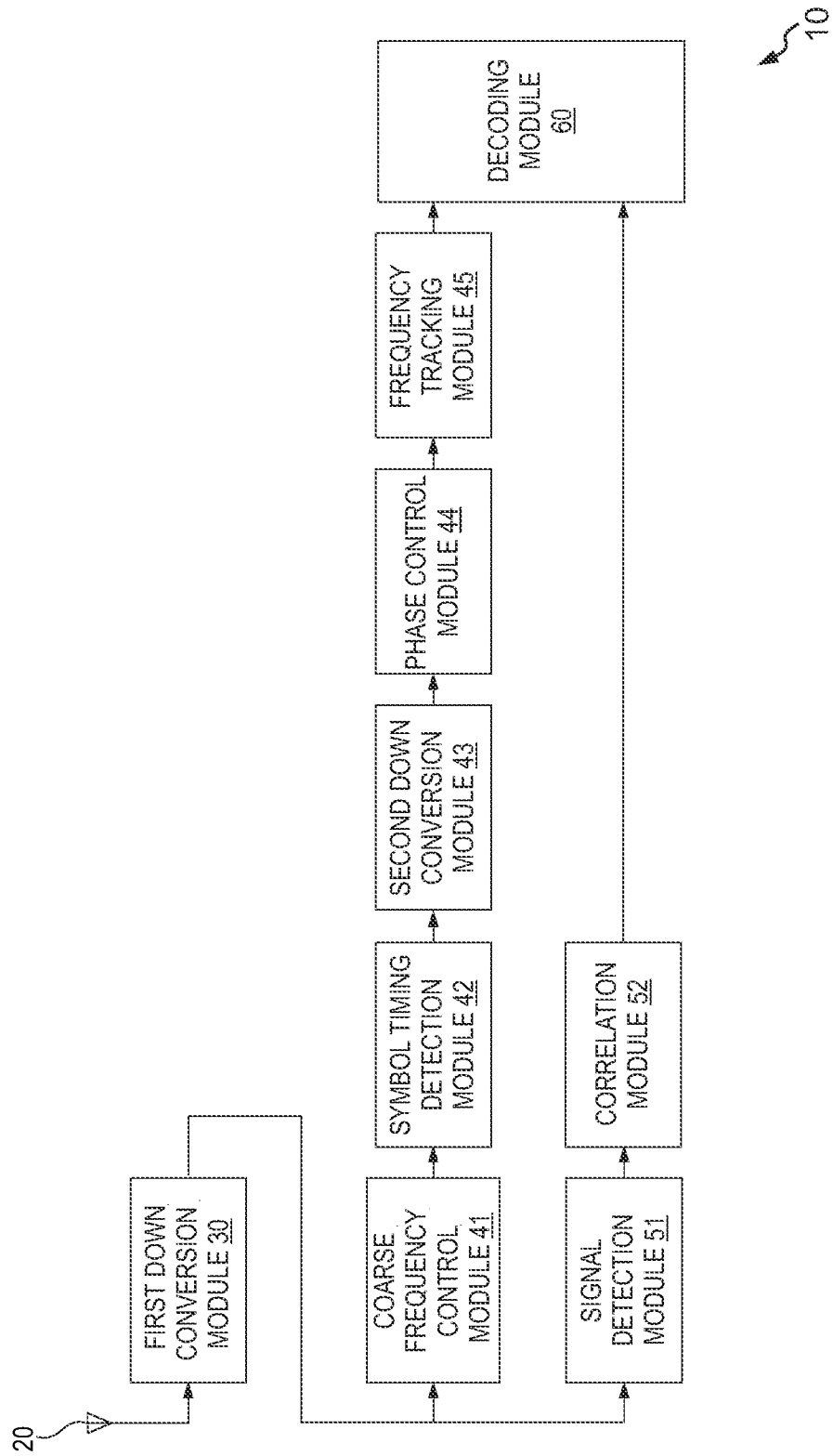
FIG. 2 illustrates a functional block diagram of an Automatic Identification System (AIS) for a ship, in accordance with an embodiment of the present disclosure.

FIG. 2 is a functional block diagram of the AIS device 10 according to an embodiment of the present disclosure. As shown in FIG. 2, the AIS device 10 includes an antenna 20, a first down conversion module 30, a coarse frequency control module 41, a symbol timing detection module 42, a second down conversion module 43, a phase control module 44, a frequency tracking module 45, a signal detection module 51, a correlation module 52, and a decoding module 60. The modules of the AIS device 10 except the antenna 20 can be realized by an analog circuit, a digital circuit, an arithmetic processing unit such as a computer, etc.

The antenna 20 receives the signal for an AIS and outputs the received signal to the first down conversion module 30. The first down conversion module 30 down-converts the received signal to a frequency (for example, 10 times the frequency) that is a predetermined multiple of the baseband signal. The first down conversion module 30 outputs the down-converted received signal to the coarse frequency control module 41 and the signal detection module 51.

FIG. 3 shows an example of the data structure of the signal for automatic identification of a ship. The signal for automatic identification of the ship is composed of Ramp-Up (RU) data, SyncWord (SW) data, Link Config Identity (LCID) data, Data Symbol (DS) data, Ramp-Down (RD) data, and Guard Time (GD) data.

RU data, SW data, LCID data, DS data, RD data, and GD data are arranged in order. RU data, SW data, LCID data, DS data, RD data, and GD data are respectively data with a prescribed number of bits and a prescribed bit arrangement, and are each modulated by a prescribed modulation method, such as, Quadrature Phase Shift Keying (QPSK), 8 Phase-Shift Keying (PSK), 16 QAM, etc.

The RU data is data representing the beginning of the data of the Automatic Identification System (AIS), for example, Universal Shipborne AIS signal. The SW data is data for timing detection and frequency control. The LCID data is data representing the modulation method of DS data. The DS data is data including various information for the AIS such as ship identification ID. RD is data for AIS signals, more specifically, data representing the end of DS data. The GD data is data used for error code correction, etc. The SW data corresponds to the "code for synchronization" of the present disclosure.

FIG. 4 shows an example of a bit array of the SW data. As shown in FIG. 4, the SW data is composed of a non-inversion code 402 and an inversion code 404. The SW data is a sequence code of a non-inversion code and an inversion code. Specifically, the non-inversion code is, for example, a Barker code string of N=13. The inversion code 404 is a code obtained by inverting the non-inversion code 402.

For example, the non-inversion code is "1, 1, 1, 1, 1, 0, 0, 1, 0, 0, 1, 0, 0, 1, 1, 0, 0, 0, 1, 0, 0, 1, 0." Thus, SW data is "1, 1, 1, 1, 1, 1, 0, 0, 1, 1, 0, 1, 0, 0, 0, 0, 0, 1, 1, 0, 0, 1, 0, 0, 1, 0, 1, 0, 1, 0, 1, 0, 1, 0."

The coarse frequency control module 41 estimates and calculates the frequency deviation from the received signal to perform coarse frequency control. By the processing of the coarse frequency control module 41, for example, the frequency of the reference signal is driven from a range of +/−500 Hz to a range of +/−30 Hz relative to the frequency of the received signal.

The symbol timing detection module 42 detects symbol timing for the received signal after the coarse control output from the coarse frequency control module 41. The second down conversion module 43 down-converts the output signal of the symbol timing detection module 42 to the baseband frequency. The phase control module 44 performs automatic phase control on the signal down-converted to the baseband (baseband signal).

The frequency tracking module 45 performs automatic phase control and automatic frequency control with higher accuracy on the baseband signal output from the phase control module 44. This forces the frequency of the reference signal from a range of +/−500 Hz to a range of +/−30 Hz relative to the frequency of the received signal. Therefore, convergence to the desired symbol point can be achieved with high accuracy. The frequency tracking module 45 outputs the signal (demodulated signal) after the automatic phase control and the automatic frequency control to the decoding module 60. The signal detection module 51 detects the RU data of the received signal.

The correlation module 52 uses the timing of the RU data to perform correlation processing between the received signal and the reference code. The specific configuration and processing of the correlation module 52 will be described later. The correlation module 52 outputs the correlation processing result to the decoding module 60. The correlation processing result output from the correlation module 52 has a main lobe corresponding to the slot timing of the received signal. Therefore, the correlation result (output correlation result) output from the correlation module 52 enables the detection of the slot timing of the received signal. That is, the correlation module 52 corresponds to the "timing detection device 52" of the present disclosure Using the demodulation signal and the timing of detection of the main lobe of the correlation result (peak detection timing), the decoding module 60 decodes data including various information for an AIS such as a ship identification ID from the DS (Data Symbol) data.

FIG. 5A is a diagram showing an example of the bit arrangement of a main reference code C51 in accordance with a first embodiment of the present disclosure, and FIG. 5B is a diagram showing an example of the bit arrangement of an auxiliary reference code C52 in accordance with the first embodiment of the present disclosure.

The main reference code generation module 525 generates the main reference code C51 using the reference frequency signal. The main reference code generation module 525 outputs the generated main reference code C51 to the correlation processing module 521.

As shown in FIG. 5A, the main reference code C51 is a sequence code of a first code sequence C511 and a second code sequence C512. The first code sequence C511 is the same code as the non-inversion code of SW data. The second code sequence C512 is the same code as the inversion code of SW data. Specifically, in this embodiment, the first code sequence C511 is "1, 1, 1, 1, 1, 0, 0, 1, 0, 1, 0, 1, 0, 0, 1, 0, 1" and the second code sequence C512 is "0, 0, 0, 0, 0, 1, 0, 0, 1, 0, 0." Therefore, the main reference code C51 is "1, 1, 1, 1, 1, 1, 0, 0, 1, 1, 0, 1, 0, 0, 0, 0, 0, 1, 1, 0, 0, 1, 0, 0, 1, 0, 1, 0, 1, 0, 1, 0, 1, 0, 1, 0" and is the same code as SW data.

The auxiliary reference code generation module 526 generates the auxiliary reference code C52 using a reference frequency signal. The auxiliary reference code generation module 526 outputs the generated auxiliary reference code C52 to the correlation processing module 522.

As shown in FIG. 5B, the auxiliary reference code C52 is a sequence code of the first code sequence C511. The first code sequence C511 is the same code as the non-inversion code of the SW data. Specifically, in this embodiment, the first code sequence C511 is "1,1,1,1,1,1,0,0,1,1,0,1." Therefore, the auxiliary reference code C52 is "1, 1, 1, 1, 1, 1, 0, 0, 1, 1, 1, 1, 1, 1, 1, 1, 0, 0, 1, 1, 0, 1, 1, 0, 1, 0, 1, 0, 1." That is, the auxiliary reference code C52 is constructed using a portion of the SW data, and more specifically, a non-inversion code of the SW data.

The first correlation processing module 521 performs correlation processing between the received signal and the main reference code C51, and outputs the absolute value data of the first correlation result (first correlation data) to the subtraction module 523.

The second correlation processing module 522 performs correlation processing between the received signal and the auxiliary reference code C52, and outputs the absolute value data of the second correlation result (second correlation data) to the subtraction module 523

The subtraction module 523 differentiates the absolute value data of the first correlation result (first correlation data) from the absolute value data of the second correlation result (second correlation data), and outputs the final correlation result (final correlation data).

Figure 6A:
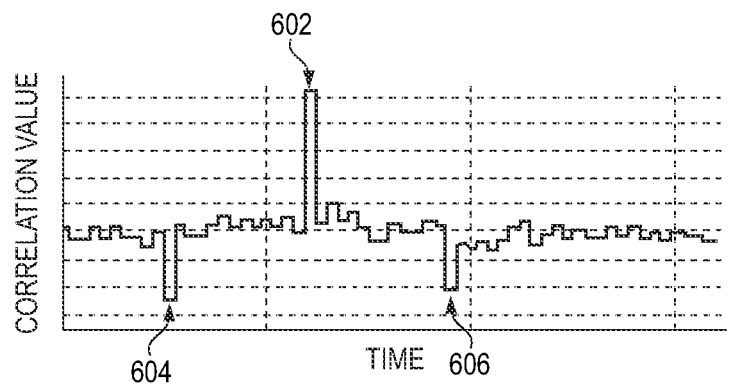
FIG. 6A and FIG. 6B are diagrams showing the correlation result (first correlation result) between SW data and the main reference code, in accordance with the first embodiment of the present disclosure.
Figure 6B:
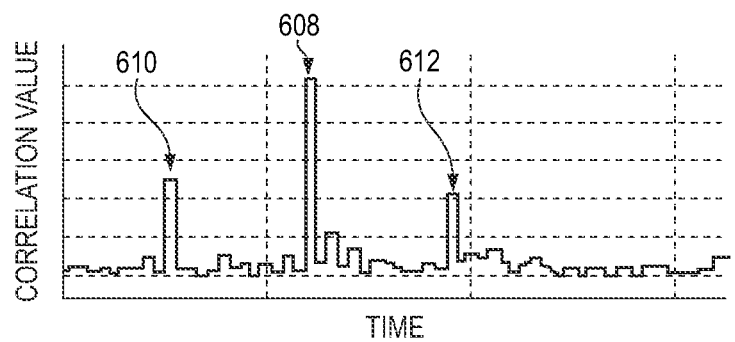
Figure 6C:
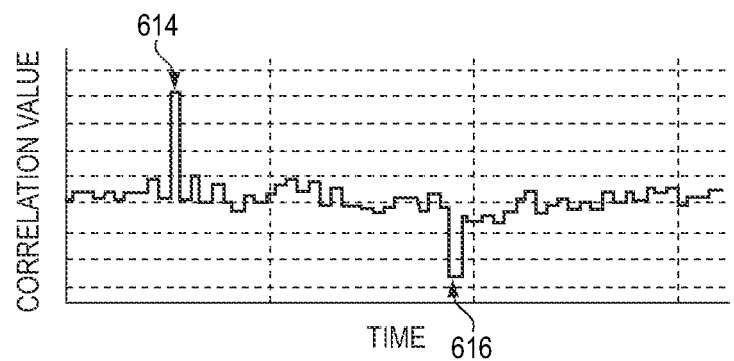
FIG. 6C and FIG. 6D are diagrams showing the correlation result (second correlation result) between the SW data and the auxiliary reference code, in accordance with the first embodiment of the present disclosure.
Figure 6D:
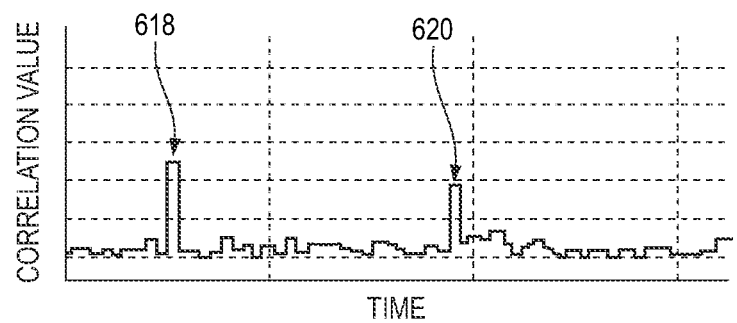

FIG. 6A and FIG. 6B show the correlation result (first correlation result) between the SW data and the main reference code C51, and FIG. 6C and FIG. 6D show the correlation result (second correlation result) between the SW data and the auxiliary reference code C52. FIG. 6B shows the absolute value data of FIG. 6A, and FIG. 6D shows the absolute value data of FIG. 6C. The main lobe 602 and the side lobes 604 and 606 in the correlation result are shown in FIG. 6A, the main lobe 608 and the side lobes 610 and 612 in the correlation result are shown in FIG. 6B, the side lobes 614 and 616 in the correlation result are shown in FIG. 6C, the side lobes 618 and 620 in the correlation result are shown in FIG. 6D.

As mentioned above, the SW data contains N=26 bits and can have a longer code length than the Barker code string with N=13. This can increase the ratio of the size of the peak produced in the correlation result to the size of the noise floor and achieve synchronization and frequency control with greater precision. However, by using the Barker code sequence consecutively, the suppression effect of the side lobe, as when using the Barker code sequence alone, is reduced. Thus, as shown in FIG. 6A and FIG. 6B, the first correlation result (first correlation data), in which the correlation is performed using the main reference code C51 having the same code structure as the SW data, generates the side lobes 604, 606, 610, and 612 of a prescribed level together with the main lobe 602 and 608.

Here, the second correlation result (second correlation data), in which the correlation is performed using the auxiliary reference code C52 having the above code structure, generates only the side lobes 614, 616, 618, and 620 as shown in FIG. 6C and FIG. 6D. Moreover, by making the main reference code C51 and the auxiliary reference code C52 have the above code structure, the position of the side lobe (position on the time axis) of the correlation (first correlation result (first correlation data)) using the main reference code C51 and the position of the side lobe (position on the time axis) of the correlation (second correlation result (second correlation data)) using the auxiliary reference code C52 become the same.

Figure 7:
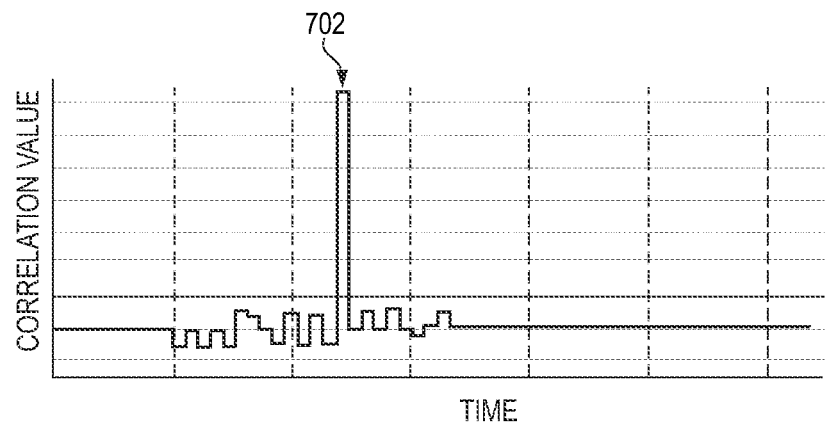
FIG. 7 is a diagram showing the final correlation result (final correlation data), in accordance with the first embodiment of the present disclosure.

Therefore, when the subtraction module 523 performs a difference operation between the first correlation result (first correlation data) and the second correlation result (second correlation data), the side lobes are canceled and suppressed, and only the main lobe remains. FIG. 7 shows the final correlation result (final correlation data). As shown in FIG. 7, the final correlation result (final correlation data) has almost no side lobe and the main lobe 702 remains. Thus, by using the configuration and processing of this embodiment, the correlation module 52 (or the timing detection device 52) can suppress the side lobe during correlation processing. Thus, the AIS device 10 can perform synchronization with high accuracy. The AIS device 10 can also perform frequency control with high accuracy.

Figure 8:
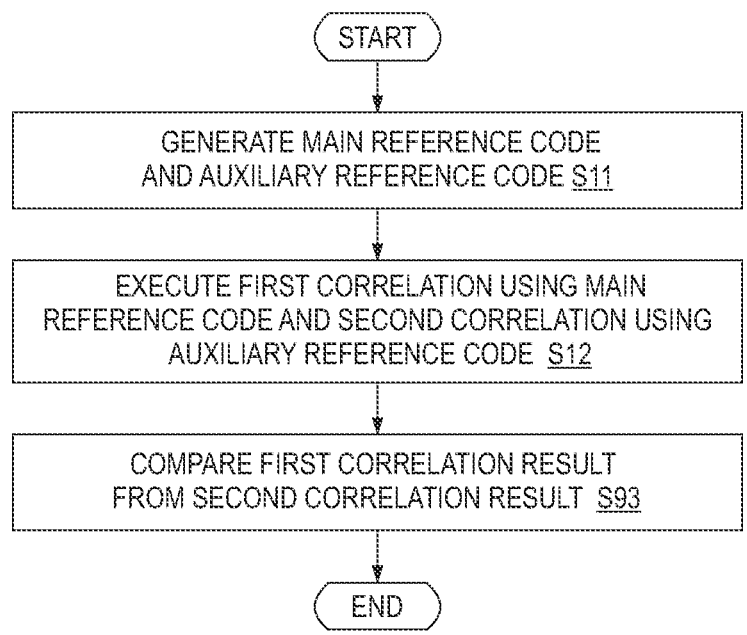
FIG. 8 is a flowchart showing an example of a timing detection method, in accordance with an embodiment of the present disclosure.

FIG. 8 is a flowchart showing an example of a timing detection method according to an embodiment of the present disclosure. In the specific content of each process of the flowchart shown in FIG. 8, each module described by the explanation of the above configuration is omitted from the description below.

At step S11 of the timing detection method, the correlation module 52 generates the main reference code C51, and the auxiliary reference code C52. At step S12 of the timing detection method, the correlation module 52 executes the first correlation using the main reference code C51 and the second correlation using the auxiliary reference code C52. At step S13 of the timing detection method, the correlation module 52 differentiates the first correlation result from the second correlation result.

Figure 9A:
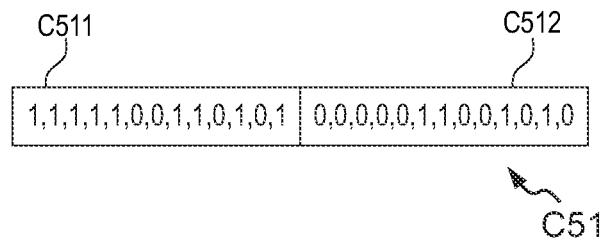
FIG. 9A shows an example of a bit arrangement of the main reference code, in accordance with a second embodiment of the present disclosure.
Figure 9B:
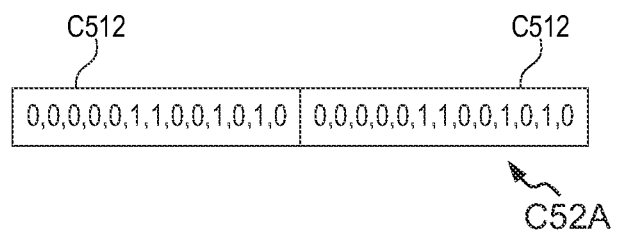
FIG. 9B shows an example of a bit arrangement of the auxiliary reference code, in accordance with the second embodiment of the present disclosure.
Figure 10A:
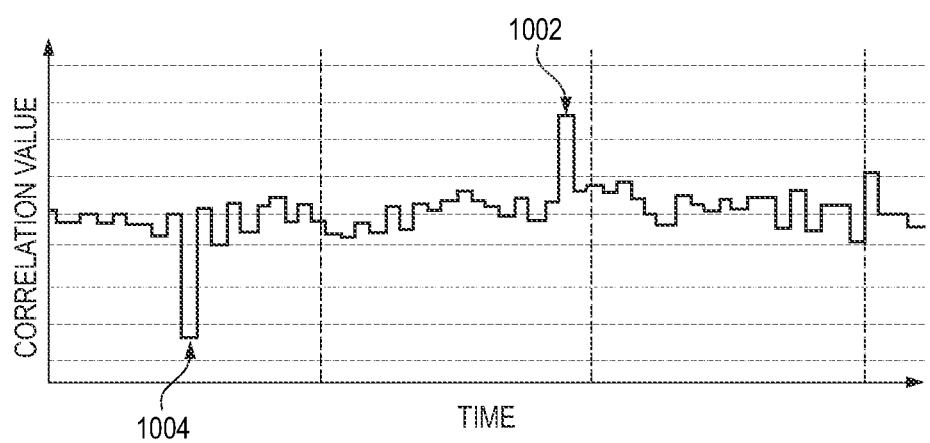
FIG. 10A and FIG. 10B show the correlation result (second correlation result) between the SW data and the auxiliary reference code, in accordance with the second embodiment of the present disclosure.
Figure 10B:
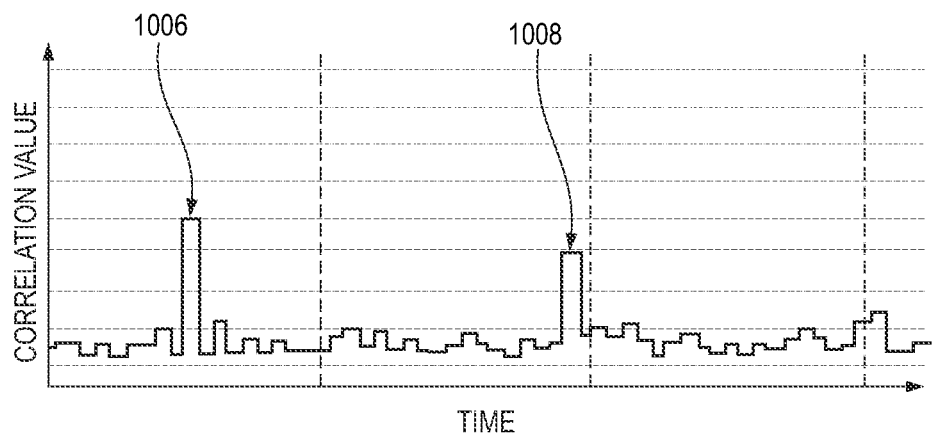

A timing detection technique according to a second embodiment of the present disclosure will be described with reference to the figures. FIG. 9A is a diagram showing an example of the bit arrangement of the main reference code C51 according to the second embodiment of the present disclosure, and FIG. 9B is a diagram showing an example of the bit arrangement of an auxiliary reference code C52A according to the second embodiment of the present disclosure. FIG. 10A and FIG. 10B are diagrams showing the correlation result (second correlation result) between SW data and the auxiliary reference code C52A. FIG. 10B is the absolute value data in FIG. 10A.

The timing detection technique of the second embodiment differs in the auxiliary reference code from the timing detection technique of the first embodiment. Other contents of the timing detection technique of the second embodiment are the same as those of the timing detection technique of the first embodiment, and each description of the same modules is omitted.

As shown in FIG. 9A, the correlation module 52 generates a code in which the first code sequence C511 and the second code sequence C512 continue as the main reference code C51. Therefore, the main reference code C51 is the same code as the SW data. The correlation module 52 uses the main reference code C51 to execute the first correlation.

As shown in FIG. 9B, the correlation module 52 generates a code in which the second code sequence C512 continues as the auxiliary reference code C52A. Specifically, in this embodiment, the auxiliary reference code C52A is "0, 0, 0, 0, 0, 1, 1, 0, 0, 1, 0, 0, 0, 0, 0, 0, 0, 0, 1, 1, 0, 0, 1, 0, 1, 0, 1, 0, 1, 0, 1, 0." The correlation module 52 executes the second correlation using the auxiliary reference code C52A.

By using the auxiliary reference code C52A, as shown in FIG. 10A and FIG. 10B, in the second correlation result (the second correlation data), the main lobe is suppressed and the side lobe is generated without suppression. The side lobes 1002 and 1004 in the correlation result are shown in FIG. 10A and the side lobes 1006 and 1008 in the correlation result are shown in FIG. 10B. Therefore, by using the auxiliary reference code C52A, the side lobe can be suppressed in the final correlation result (the final correlation data).

Figure 11A:
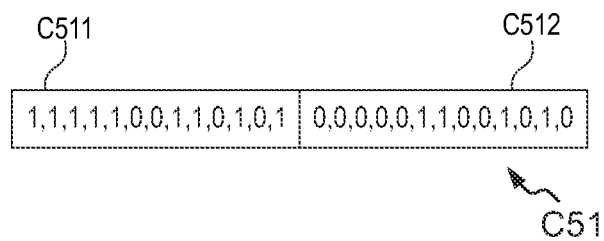
FIG. 11A shows an example of a bit arrangement of the main reference code according to a third embodiment, in accordance with a third embodiment of the present disclosure.
Figure 11B:
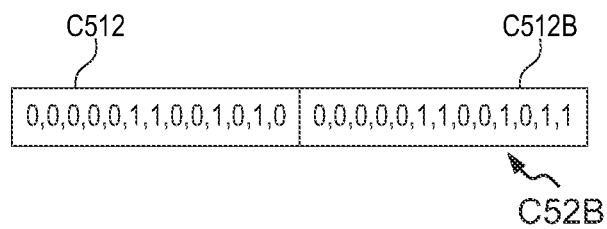
FIG. 11B shows an example of a bit arrangement of the auxiliary reference code according to the third embodiment, in accordance with the third embodiment of the present disclosure.
Figure 12:
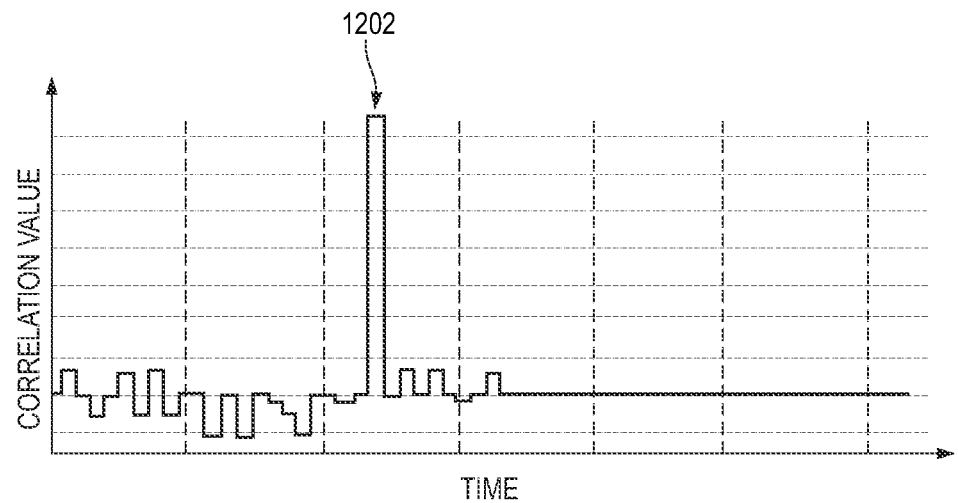
FIG. 12 shows the final correlation result (final correlation data), in accordance with the third embodiment of the present disclosure.

A timing detection technique according to a third embodiment of the present disclosure will be described with reference to the figures. FIG. 11A is a diagram showing an example of the bit arrangement of the main reference code C51 according to the third embodiment, and FIG. 11B is a diagram showing an example of the bit arrangement of the auxiliary reference code C52B according to the third embodiment of the present disclosure. FIG. 12 is a diagram showing the final correlation result (final correlation data) according to the third embodiment.

The timing detection technique according to the third embodiment differs from the timing detection technique according to the second embodiment in the auxiliary reference code C52B. The other contents of the timing detection technique according to the third embodiment are the same as those of the timing detection technique according to the second embodiment, and each description of the same modules is omitted.

As shown in FIG. 11A, the correlation module 52 generates a code in which the first code sequence C511 and the second code sequence C512 continue as the main reference code C51. Therefore, the main reference code C51 is the same code as the SW data. The correlation module 52 executes the first correlation using the main reference code C51.

As shown in FIG. 11B, in the correlation module 52, as the auxiliary reference code C52B, the second code sequence C512 and the third code sequence C512B sequentially generate codes. The third code sequence C512B is a code in which some bits of the second code sequence C512 are different. More specifically, the third code sequence C512B is a code in which the last bit of the second code sequence C512 is reversed.

More specifically, in this embodiment, the third code sequence C512B is "0, 0, 0, 0, 0, 1, 0, 0, 1, 1." Therefore, the auxiliary reference code C52B is "0,0,0,0,0,0,0,1,0,0,0, 0,0,0,0,0,0,0,0,0,0,0,0,0,0,0,0,1,0,0,0,1,0,1."

The correlation module 52 executes the second correlation using the auxiliary reference code C52B.

By using such auxiliary reference code C52B, as in the second embodiment, the main lobe is suppressed and the side lobe is generated with little suppression.

Therefore, as shown in FIG. 12, in the final correlation result (final correlation data), the main lobe 1202 is not suppressed and the side lobe can be suppressed.

Figure 13A:
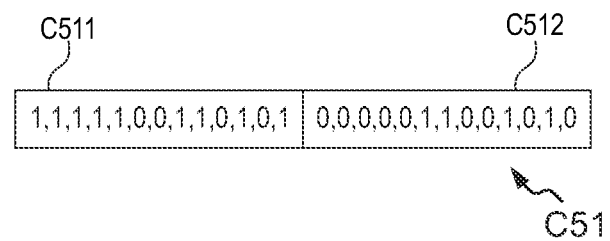
FIG. 13A shows an example of a bit arrangement of the main reference code, in accordance with a fourth embodiment of the present disclosure.
Figure 13B:
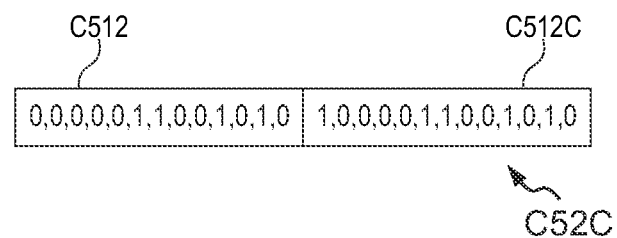
FIG. 13B shows an example of a bit arrangement of the auxiliary reference code, in accordance with the fourth embodiment of the present disclosure.
Figure 14:
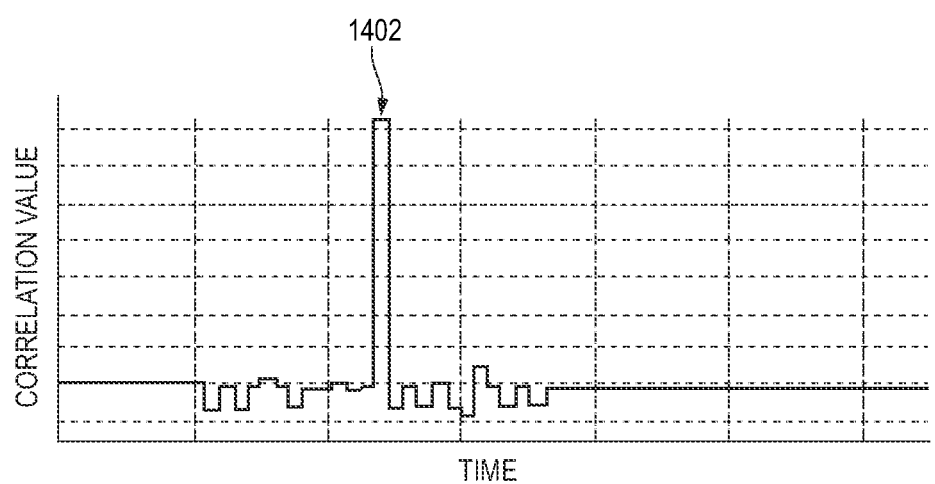
FIG. 14 shows the final correlation result (final correlation data), in accordance with the fourth embodiment of the present disclosure.

A timing detection technique according to a fourth embodiment of the present disclosure will be described with reference to the figures. FIG. 13A is a diagram showing an example of the bit arrangement of the main reference code C51 according to the fourth embodiment, and FIG. 13B is a diagram showing an example of the bit arrangement of an auxiliary reference code C52C according to the fourth embodiment. FIG. 14 is a diagram showing the final correlation result (final correlation data) according to the fourth embodiment.

The timing detection technique of the fourth embodiment differs in the auxiliary reference code from the timing detection technique of the second embodiment. Other contents of the timing detection technique of the fourth embodiment are the same as those of the timing detection technique of the second embodiment, and each description of the same modules is omitted.

As shown in FIG. 13A, the correlation module 52 generates a code in which the first code sequence C511 and the second code sequence C512 continue as the main reference code C51. Therefore, the main reference code C51 is the same code as the SW data. The correlation module 52 uses the main reference code C51 to execute the first correlation.

As shown in FIG. 13B, in the correlation module 52, as the auxiliary reference code C52B, the second code sequence C512 and a fourth code sequence C512C sequentially generate codes. The fourth code sequence C512C is a code in which some bits of the second code sequence C512 are different. More specifically, the fourth code sequence C512C is a code in which the first bit of the second code sequence C512 is reversed.

Specifically, in this embodiment, the fourth code sequence C512C is "1, 0, 0, 0, 0, 1, 1, 0, 0, 1, 0, 1, 0." Therefore, the auxiliary reference code C52B is "0, 0, 0, 0, 0, 1, 1, 0, 0, 1, 0, 1, 0, 1, 0, 0, 0, 0, 1, 1, 0, 0, 1, 0, 1, 0, 1, 0, 1, 0, 1, 0, 1, 0, 0, 0."

The correlation module 52 executes the second correlation using the auxiliary reference code C52C.

By using such an auxiliary reference code C52C, as in the second embodiment, the main lobe is suppressed and the side lobe is generated with little suppression.

Therefore, as shown in FIG. 14, in the final correlation result (final correlation data), the main lobe 1402 is not suppressed and the side lobe can be suppressed.

What is claimed is:

1. A timing detection device, comprising:
   processing circuitry configured:
   to generate a main reference code consisting of the same code as a code for synchronization included in a received signal;
   to generate, by using a portion of the same code as the code for synchronization, an auxiliary reference code consisting of a code configuration different from the main reference code and suppressing the generation of a main lobe during a correlation process;
   to output a first correlation result by correlating the received signal with the main reference code;
   to output a second correlation result by correlating the received signal with the auxiliary reference code; and
   to subtract the first correlation result from the second correlation result.

2. The timing detection device according to claim 1, wherein
   the code for synchronization is composed of a first code sequence of a non-inversion code consisting of a prescribed spread code and an inversion code of the spread code, and
   the processing circuitry is further configured to generate the auxiliary reference code using the first code sequence of the non-inversion code.

3. The timing detection device according to claim 2, wherein
   the auxiliary reference code is a sequence code of the non-inversion code.

4. The timing detection device according to claim 3, wherein
   the code for synchronization is a Barker code.

5. The timing detection device according to claim 2, wherein
the code for synchronization is a Barker code.

6. The timing detection device according to claim 1, wherein
the code for synchronization is composed of a second code sequence of a non-inversion code consisting of a prescribed spread code and an inversion code of the spread code, and
the processing circuitry is further configured to generate the auxiliary reference code using a sequence code of the inversion code.

7. The timing detection device according to claim 6, wherein
the auxiliary reference code is the sequence code of the inversion code.

8. The timing detection device according to claim 7, wherein
the code for synchronization is a Barker code.

9. The timing detection device according to claim 6, wherein
the code for synchronization is a Barker code.

10. The timing detection device according to claim 1, wherein
the code for synchronization is a Barker code.

11. A timing detection method, comprising:
generating a main reference code consisting of the same code as a code for synchronization included in a received signal;
generating an auxiliary reference code consisting of a code configuration different from the main reference code by using a portion of the same code as the code for synchronization and suppressing generation of a main lobe during a correlation process;
outputting a first correlation result by correlating the received signal with the main reference code;
outputting a second correlation result by correlating the received signal with the auxiliary reference code; and
subtracting the first correlation result from the second correlation result.

12. The timing detection method according to claim 11, wherein
the code for synchronization is composed of a sequence code of a non-inversion code consisting of a prescribed spread code and an inversion code of the spread code, and the auxiliary reference code is generated using the sequence code of the non-inversion codes.

13. The timing detection method according to claim 12, wherein
the auxiliary reference code is the sequence code of the non-inversion code.

14. The timing detection method according to claim 11, wherein
the code for synchronization is composed of a sequence code of a non-inversion code consisting of a prescribed spread code and an inversion code of the spread code, and the auxiliary reference code is generated using a sequence code of the inversion codes.

15. The timing detection method according to claim 14, wherein
the auxiliary reference code (C52A) is the sequence code of the inversion code.

16. A non-transitory computer readable medium having instructions to cause a processing unit to execute processing, the processing comprising:
generating a main reference code consisting of the same code as a code for synchronization included in a received signal;
generating an auxiliary reference code consisting of a code configuration different from the main reference code by using a portion of the same code as the code for synchronization and suppressing generation of a main lobe during a correlation process;
outputting a first correlation result by correlating the received signal with the main reference code;
outputting a second correlation result by correlating the received signal with the auxiliary reference code; and
subtracting the first correlation result from the second correlation result.

17. The non-transitory computer readable medium according to claim 16, wherein
the code for synchronization is composed of a sequence code of a non-inversion code consisting of a prescribed spread code and an inversion code of the spread code, and the auxiliary reference code is generated using the sequence code of the non-inversion codes.

18. The non-transitory computer readable medium according to claim 17, wherein
the auxiliary reference code is the sequence code of the non-inversion code.

19. The non-transitory computer readable medium according to claim 16, wherein
the code for synchronization is composed of a sequence code of a non-inversion code consisting of a prescribed spread code and an inversion code of the spread code, and the auxiliary reference code is generated using a sequence code of the inversion codes.

20. The non-transitory computer readable medium according to claim 19, wherein
the auxiliary reference code is the sequence code of the inversion code.

* * * * *